US012395326B2

(12) United States Patent
Mizutani et al.

(10) Patent No.: US 12,395,326 B2
(45) Date of Patent: Aug. 19, 2025

(54) CLASSICAL COMPUTER, INFORMATION PROCESSING METHOD, AND COMPUTER READABLE MEDIUM

(71) Applicants: Mitsubishi Electric Corporation, Tokyo (JP); NIPPON TELEGRAPH AND TELEPHONE CORPORATION, Tokyo (JP)

(72) Inventors: Akihiro Mizutani, Tokyo (JP); Ryo Hiromasa, Tokyo (JP); Yusuke Aikawa, Tokyo (JP); Yuki Takeuchi, Tokyo (JP); Seiichiro Tani, Tokyo (JP)

(73) Assignees: MITSUBISHI ELECTRIC CORPORATION, Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 150 days.

(21) Appl. No.: 18/385,716

(22) Filed: Oct. 31, 2023

(65) Prior Publication Data
US 2024/0080185 A1    Mar. 7, 2024

Related U.S. Application Data

(63) Continuation of application No. PCT/JP2022/021695, filed on May 27, 2022.

(30) Foreign Application Priority Data

Jun. 4, 2021    (JP) ................. 2021-094443

(51) Int. Cl.
*H04L 9/08*    (2006.01)
*G06N 10/70*    (2022.01)
*H04L 9/30*    (2006.01)

(52) U.S. Cl.
CPC ........... *H04L 9/0852* (2013.01); *G06N 10/70* (2022.01); *H04L 9/30* (2013.01)

(58) Field of Classification Search
CPC .......... H04L 9/0852; H04L 9/30; G06N 10/70
See application file for complete search history.

(56) References Cited

U.S. PATENT DOCUMENTS 11,049,038 B2 * 6/2021 Chen ...................... G06N 10/60
11,436,519 B1 * 9/2022 Dridi ...................... G06N 20/00
(Continued)

FOREIGN PATENT DOCUMENTS

| JP | 2007-189517 A | 7/2007 |
| JP | 2019-79226 A | 5/2019 |
| JP | 2019-517184 A | 6/2019 |

OTHER PUBLICATIONS

International Search Report, issued in PCT/JP2022/021695, PCT/ISA/210, dated Aug. 2, 2022.
(Continued)

*Primary Examiner* — Viral S Lakhia
(74) *Attorney, Agent, or Firm* — BIRCH, STEWART, KOLASCH & BIRCH, LLP

(57) ABSTRACT

A result confirmation unit (204) computes a state space probability that is a probability that a verification target device (300) has not correctly prepared a state space having a quantum state stored therein, a Pauli measurement probability that is a probability that the verification target device (300) has not correctly performed Pauli Z measurement and Pauli X measurement, and a magic state probability that is a probability that the verification target device (300) has not generated a magic state of CCZ. Then, using the state space probability, the Pauli measurement probability, and the magic state probability, the result confirmation unit (204) computes a degree of approximation between a quantum state and the magic state of CCZ at the verification target
(Continued)

device (300) and measurement accuracies of the Pauli Z measurement and the Pauli X measurement on the quantum state at the verification target device (300).

9 Claims, 4 Drawing Sheets

(56) References Cited

U.S. PATENT DOCUMENTS

| | | | | |
|---|---|---|---|---|
| 11,444,636 | B2* | 9/2022 | Lucarelli | H03M 13/616 |
| 11,567,827 | B2* | 1/2023 | Zheng | G06N 10/40 |
| 11,599,820 | B1* | 3/2023 | Noh | G06N 10/20 |
| 11,894,860 | B2* | 2/2024 | McClean | G06N 10/60 |
| 11,900,213 | B2* | 2/2024 | Ibe | G06N 10/60 |
| 11,909,392 | B2* | 2/2024 | Gidney | G06N 10/20 |
| 2017/0338951 | A1 | 11/2017 | Fu et al. | |
| 2019/0197426 | A1 | 6/2019 | Kawano et al. | |
| 2020/0279185 | A1* | 9/2020 | Wiebe | G06N 3/047 |
| 2023/0206102 | A1* | 6/2023 | Raussendorf | G06N 10/20 706/62 |
| 2023/0259673 | A1* | 8/2023 | Hollenberg | G06N 10/40 703/2 |
| 2024/0242100 | A1* | 7/2024 | Nickerson | G06N 10/20 |
| 2024/0303521 | A1* | 9/2024 | Gimeno-Segovia | G06N 10/40 |

OTHER PUBLICATIONS

Metger et al., "Self-testing of a single quantum device under computational assumptions", arXiv:2001.09161V2, Dec. 1, 2020, total 61 pages.

Reichardt et al., "Classical command of quantum systems", Nature, Apr. 25, 2013, vol. 496, p. 456-460.

Takeuchi et al., "Verification of Many-Qubit States", Physical Review X 8, 021060, (2018), total 16 pages.

* cited by examiner

CLASSICAL COMPUTER, INFORMATION PROCESSING METHOD, AND COMPUTER READABLE MEDIUM

CROSS REFERENCE TO RELATED APPLICATIONS

This application is a Continuation of PCT International Application No. PCT/JP2022/021695 filed on May 27, 2022, which claims priority under 35 U.S.C. § 119(a) to Patent Application No. 2021-094443 filed in Japan on Jun. 4, 2021, all of which are hereby expressly incorporated by reference into the present application.

TECHNICAL FIELD

The present disclosure relates to techniques for verifying quantumness.

BACKGROUND ART

A test where a classical computer used by a verifier only exchanges classical information with a device given as a black box and having unknown internal operations (hereinafter, referred to as a black box device) and verifies whether the black box device is performing "generation and measurement of quantum states" as requested by the verifier is called a self-test. By performing this self-test, the classical computer used by the verifier can characterize the operation of the black box device, which has higher computation ability than the classical computer. Self-tests enable realization of various kinds of quantum information processing, such as quantum cryptography.

Non-Patent Literature 1 proposes a self-test method for "Bell states", which are quantum states of two quantum bits with quantum correlation. With the method of Non-Patent Literature 1, generation and measurement of Bell states can be verified by only exchanging classical information between a classical computer and a black box device. However, the method of Non-Patent Literature 1 requires making an assumption that "two devices" are given as black box devices and the two black box devices cannot exchange any classical information during execution of a self-test. If this assumption does not hold, a self-test on Bell states cannot be performed with the method of Non-Patent Literature 1. As classical information can be easily exchanged by telephone or the like, the method has an issue in that it is not realistic to impose the assumption on actual black box devices.

In order to solve the issue, Non-Patent Literature 2 makes a computational assumption that a black box device that behaves in a quantum manner is not able to break quantum-proof computer encryption called lattice-based cryptography. Non-Patent Literature 2 shows that making such a computational assumption makes a self-test on Bell states available also for "a single black box device that behaves in a quantum manner". It is considered that quantum-proof computer encryption cannot be efficiently broken even by a quantum computer. Thus, Non-Patent Literature 2 provides a self-test method for Bell states on a single black box device under a realistic assumption.

CITATION LIST

Non-Patent Literature

Non-Patent Literature 1: Ben W. Reichardt, Falk Unger, Umesh Vazirani. Classical command of quantum systems. Nature volume 496, pages 456-460 (2013).

Non-Patent Literature 2: Tony Metger and Thomas Vidick. Self-testing of a single quantum device under computational assumptions. arXiv:2001.09161V2 (2020).

SUMMARY OF INVENTION

Technical Problem

The aforementioned "Bell state" is a quantum state in a class of a so-called stabilizer state, which stabilizes with Pauli Z measurement and Pauli X measurement. Whether a black box device being verified is generating a Bell state or not can be verified from a measurement result of a stabilizer measurement that consists of Pauli Z measurement and Pauli X measurement. Specifically, the self-test method proposed in Non-Patent Literature 2 consists of the following two tests:

(A) A test of whether the black box device being verified is properly performing Pauli Z measurement and Pauli X measurement or not; and
(B) A test of whether the measurement result of stabilizer measurement of Bell states is correct or not.

The self-test method proposed in Non-Patent Literature 2 is a test based on the properties of a stabilizer state. Accordingly, a self-test can also be performed on other stabilizer states by using the method of Non-Patent Literature 2. Here, a universal set of quantum state consists of a "stabilizer state" and a "non-stabilizer state", which are two state sets exclusive to each other. The results of Non-Patent Literature 2 have proved that self-tests are possible on the stabilizer state. However, it is not clear whether self-tests are possible on the other state class, the non-stabilizer state, in the same framework as Non-Patent Literature 2.

A primary object of the present disclosure is to solve this challenge. More specifically, an object of the present disclosure is to perform a self-test also on a "magic state of CCZ (Controlled Controlled-Z)", which is a representative non-stabilizer state. The stabilizer state is a state insufficient for the realization of quantum computation. In contrast, the magic state of CCZ is known to be an essential state for the realization of quantum computation. Therefore, the present disclosure provides verification of quantumness of whether a black box device possesses a resource state essential for the realization of quantum computation.

Solution to Problem

A classical computer according to the present disclosure includes:

a state space probability computation unit to, using a first measurement result and a second measurement result, compute a state space probability that is a probability that a quantum computer has not correctly prepared a state space having a first quantum state stored therein, the first quantum state being a quantum state generated by the quantum computer, wherein the first measurement result is a result of measuring the first quantum state by the quantum computer, and the second measurement result is a result of measuring a second quantum state by the quantum computer, the second quantum state being a quantum state after change of the first quantum state caused by the measurement of the first quantum state;

a Pauli measurement probability computation unit to, using a third measurement result, a fourth measurement result, and the first measurement result, compute a Pauli measurement probability that is a probability that the quantum computer has not correctly performed Pauli Z measurement and Pauli X measurement on a fourth quantum state, wherein the third measurement result is a result of measuring a third quantum state by the quantum computer, the third quantum state being a quantum state after change of the first quantum state caused by the measurement of the first quantum state and different from the second quantum state, and the fourth measurement result is a result of measuring the fourth quantum state by the quantum computer, the fourth quantum state being a quantum state after change of the third quantum state caused by the measurement of the third quantum state;

a magic state probability computation unit to, using the first measurement result, the third measurement result, and the fourth measurement result, compute a magic state probability that is a probability that the quantum computer has not generated a magic state of CCZ (Controlled Controlled-Z); and an approximation accuracy computation unit to, using the state space probability, the Pauli measurement probability, and the magic state probability, compute a degree of approximation between the fourth quantum state and the magic state of CCZ, and measurement accuracies of the Pauli Z measurement and the Pauli X measurement on the fourth quantum state.

Advantageous Effects of Invention

The present disclosure enables self-test to be performed also on the "magic state of CCZ".

DESCRIPTION OF EMBODIMENTS

Embodiment 1

Overview

Figure 1:
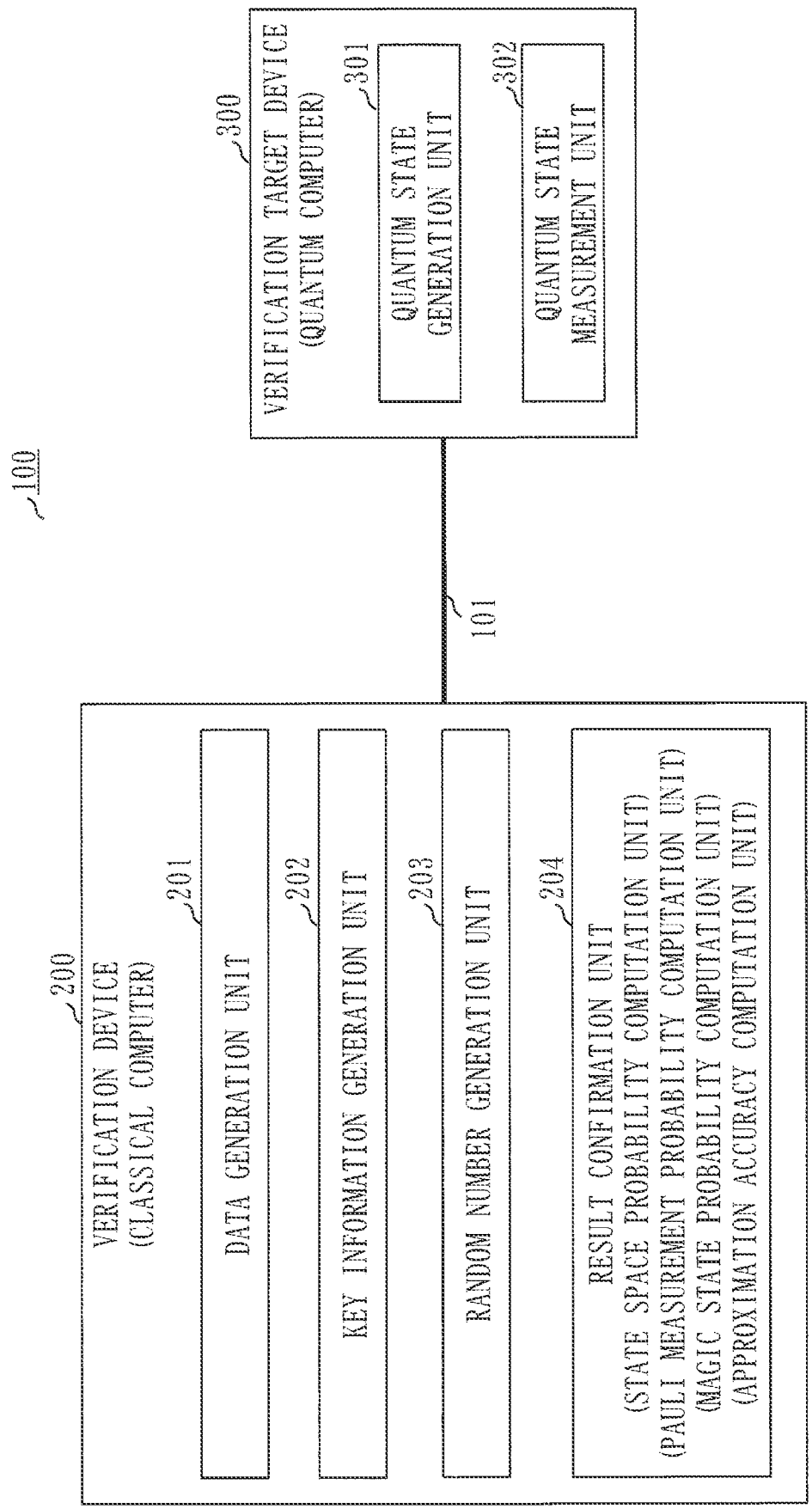
FIG. 1 shows a configuration example of a quantumness verification system according to Embodiment 1.

The present embodiment explains that a classical computer performs a self-test which verifies whether or not a quantum computer as a black box device is correctly performing "generation and measurement of quantum state" in a magic state of CCZ, in the same framework as that of Non-Patent Literature 2.

The present embodiment is attained by generalizing "a method of verifying the generation of non-stabilizer states using the measurement results of Pauli Z measurement and Pauli X measurement (the results of generalized stabilizer measurement)", provided in the Reference Literature below.

[Reference Literature] Yuki Takeuchi and Tomoyuki Morimae. Verification of Many-Qubit States. Physical Review X 8, 021060 (2018)

The verification method described in the Reference Literature assumes that just generation of the non-stabilizer state is verifiable and Pauli Z measurement and Pauli X measurement are correctly performed. That is, the verification method described in the Reference Literature does not verify whether Pauli Z measurement and Pauli X measurement are being correctly performed but only verifies whether quantum states are being correctly generated. A self-test needs to verify whether both "generation of quantum state" and "measurement of quantum state" are correctly performed or not. Accordingly, a self-test is not attained with the verification method described in the Reference Literature.

The present embodiment uses the aforementioned test (A) provided in Non-Patent Literature 2 (again referenced below) on the "magic state of CCZ", a representative non-stabilizer state.

(A) A test of whether the black box device being verified is properly performing Pauli Z measurement and Pauli X measurement or not.

By performing the above-described test (A) provided in Non-Patent Literature 2 with a classical computer, the verification method described in the Reference Literature can be generalized to a black box device for the magic state of CCZ. The present embodiment thereby can realize a self-test that verifies both the generation of quantum states and the measurement of quantum states in the magic state of CCZ.

Here, the "magic state of CCZ" is a quantum state where "controlled-controlled-phase gate (CCZ gate)" are applied to three quantum bits that are in equal superposition of "0" and "1".

The quantum states of bits "0" and "1" are represented as "$|0\rangle$" and "$|1\rangle$", respectively, and a quantum state in equal superposition of "$|0\rangle$" and "$|1\rangle$" is represented as "$|+\rangle$". In this case, the "magic state of CCZ" is a quantum state that can be represented as "$|+\rangle|+\rangle|+\rangle - 2|1\rangle|1\rangle|1\rangle$".

The "Pauli Z measurement" is directed to a two-row, two-column matrix in which the values of diagonal elements when the matrix is represented with "$|0\rangle$" and "$|1\rangle$" are "+1" and "−1" and the remaining matrix elements are "0". The "Pauli Z measurement" is a measurement that obtains a measurement result of "+1" or "−1" depending on into which eigenspace of this matrix a state is projected.

The "Pauli X measurement" is directed to a two-row, two-column matrix in which two non-diagonal elements when the matrix is represented with "$|0\rangle$" and "$|1\rangle$" are "+1" and the remaining matrix elements are "0". The "Pauli X measurement" is a measurement that obtains a measurement result of "+1" or "−1" depending on into which eigenspace of this matrix a state is projected.

*Description of Configuration*

FIG. 1 shows a configuration example of a quantumness verification system 100 according to the present embodiment.

The quantumness verification system 100 includes a verification device 200 and a verification target device 300, as shown in FIG. 1.

The verification device 200 is a classical computer which processes so-called classical information. The verification device 200 is a PC (Personal Computer), for example. An operational procedure of the verification device 200 corresponds to an information processing method. A program for implementing the operation of the verification device 200 corresponds to an information processing program.

The verification target device 300 is a quantum computer which executes quantum computation. The verification target device 300 corresponds to a black box device.

A classical communication channel 101 is a communication channel connecting the verification device 200 and the verification target device 300. The classical communication channel 101 may be any communication channel that transmits digital signals, such as a telephone network and the internet.

In the following, the configuration of the verification device 200 and the configuration of the verification target device 300 are sequentially described.

The verification device 200 shown in FIG. 1 includes a data generation unit 201, a key information generation unit 202, a random number generation unit 203, and a result confirmation unit 204.

Although not shown, the verification device 200 includes a verification-side information processing unit, which processes classical information to be used in the verification device 200.

The data generation unit 201 randomly selects one 3-bit string from a set of 3-bit strings {000, 001, 010, 100, 111}. The data generation unit 201 further transmits the 3-bit string ($\theta1, \theta2, \theta3$) selected from {000, 001, 010, 100, 111} to the key information generation unit 202.

The data generation unit 201 also generates a security parameter k and transmits the security parameter $\lambda$ to the key information generation unit 202.

Here, the 3-bit string ($\theta1, \theta2, \theta3$) and the security parameter k are also called initial data.

The key information generation unit 202 generates a public key (k1, k2, k3) and a trapdoor (tk1, tk2, tk3), using the initial data received from the data generation unit 201 (the 3-bit string ($\theta1, \theta2, \theta3$) and the security parameter $\lambda$).

Here, the public key (k1, k2, k3) is data that is used for the verification target device 300 to prove that the verification target device 300 is performing generation of the magic state of CCZ and Pauli Z measurement and Pauli X measurement on the magic state of CCZ.

The trapdoor (tk1, tk2, tk3) is data that is used for the verification device 200 to verify that the verification target device 300 is performing generation of the magic state of CCZ and Pauli Z measurement and Pauli X measurement on the magic state of CCZ.

The key information generation unit 202 calculates the public key (k1, k2, k3) and the trapdoor (tk1, tk2, tk3) with the scheme described in Non-Patent Literature 2.

The key information generation unit 202 transmits the public key (k1, k2, k3) to the verification target device 300.

The random number generation unit 203 generates a randomly selected "0" or "1" bit. Then, the random number generation unit 203 transmits the generated "0" or "1" bit to the result confirmation unit 204. The result confirmation unit 204 transmits this "0" or "1" bit to the verification target device 300. This "0" or "1" bit is called a probability computation random number. Details of the probability computation random number will be described later.

The random number generation unit 203 also generates a 3-bit random number (q1, q2, q3) and transmits the generated 3-bit random number (q1, q2, q3) to the verification target device 300 through the classical communication channel 101. The random number (q1, q2, q3) is a random number for use in measurement of a fourth quantum state, which is discussed later. This 3-bit random number is hereinafter called a measurement random number (q1, q2, q3). Details of the measurement random number (q1, q2, q3) will be described later.

The result confirmation unit 204 computes a state space probability, a Pauli measurement probability, and a magic state probability. Details of the state space probability, the Pauli measurement probability, and the magic state probability will be discussed later. The result confirmation unit 204 also computes a degree of approximation between the fourth quantum state and the magic state of CCZ as well as measurement accuracies of the Pauli Z measurement and the Pauli X measurement on the fourth quantum state, using the state space probability, the Pauli measurement probability, and the magic state probability.

The result confirmation unit 204 corresponds to a state space probability computation unit, a Pauli measurement probability computation unit, a magic state probability computation unit, and an approximation accuracy computation unit.

Processing performed by the result confirmation unit 204 corresponds to a state space probability computation process, a Pauli measurement probability computation process, a magic state probability computation process, and an approximation accuracy computation process.

The verification target device 300 includes a quantum state generation unit 301 and a quantum state measurement unit 302. Although not shown, the verification target device 300 includes a verification target device-side information processing unit, which processes data to be used in the verification target device 300.

The quantum state generation unit 301 generates quantum states.

The quantum state measurement unit 302 outputs measurement results by measuring the quantum states generated by the quantum state generation unit 301.

The verification target device 300 can be any kind of computer as long as it is a quantum computer. For example, the verification target device 300 may be a quantum computer that uses superconducting quantum bits. In that case, the quantum state generation unit 301 generates quantum states, using superconducting quantum bits and microwave. Also, the quantum state measurement unit 302 measures the quantum states of the superconducting quantum bits, using microwave, and obtains a measurement result as an electrical signal.

Figure 4:
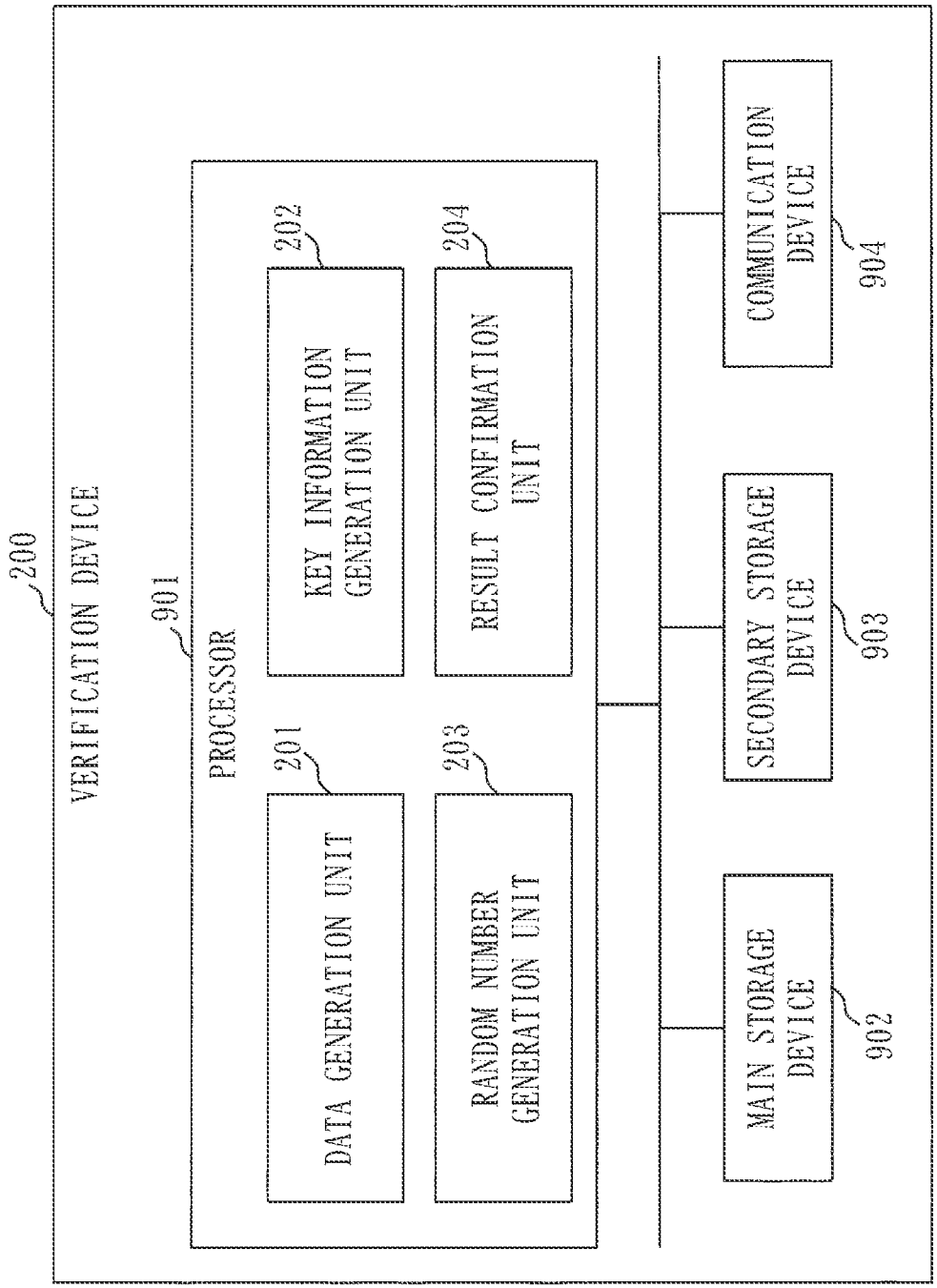
FIG. 4 shows a hardware configuration example of a verification device according to Embodiment 1.

FIG. 4 shows a hardware configuration example of the verification device 200 according to the present embodiment.

The verification device 200 includes a processor 901, a main storage device 902, a secondary storage device 903, and a communication device 904 as hardware components.

The secondary storage device 903 has stored therein programs for implementing the functions of the data generation unit 201, the key information generation unit 202, the random number generation unit 203, and the result confirmation unit 204.

These programs are loaded from the secondary storage device 903 to the main storage device 902. Then, the processor 901 executes the programs to carry out the operations of the data generation unit 201, the key information generation unit 202, the random number generation unit 203, and the result confirmation unit 204.

FIG. 4 schematically illustrates a situation where the processor 901 is executing the programs for implementing the functions of the data generation unit 201, the key information generation unit 202, the random number generation unit 203, and the result confirmation unit 204.

The communication device 904 performs classical communication with the verification target device 300 via the classical communication channel 101.

*Description of Operation*

An overview of the operation of the result confirmation unit 204 according to the present embodiment is now described. Also, an overview of the operation of the verification target device 300 necessary for describing the operation of the result confirmation unit 204 is described.

The verification target device 300 generates a quantum state in step S403 (FIG. 2), to be discussed later, based on the public key (k1, k2, k3) transmitted from the random number generation unit 203. The quantum state generated in step S403 is called a first quantum state.

The verification target device 300 measures the first quantum state (S403). The measurement result obtained from the measurement of the first quantum state by the verification target device 300 is called a first measurement result (y1, y2, y3). The verification target device 300 transmits the first measurement result (y1, y2, y3) to the verification device 200.

The steps shown below such as "S403" and "S408" represent the steps shown in FIG. 2 or 3. Details of FIGS. 2 and 3 will be discussed later.

The measurement of the first quantum state (S403) causes the quantum state to change from the first quantum state.

The quantum state after the change from the first quantum state when the value of the probability computation random number generated by the random number generation unit 203 is "0" is called a second quantum state.

The verification target device 300 measures the second quantum state (S408). The measurement result obtained from the measurement of the second quantum state by the verification target device 300 (S408) is called a second measurement result (m1, m2, m3). The verification target device 300 transmits the second measurement result (m1, m2, m3) to the verification device 200 (S409).

Meanwhile, the quantum state after the change from the first quantum state when the value of the probability computation random number is "1" is called a third quantum state. The verification target device 300 measures the third quantum state (S412). The measurement result obtained from the measurement of the third quantum state by the verification target device 300 (S412) is called a third measurement result (d1, d2, d3). The verification target device 300 transmits the third measurement result (d1, d2, d3) to the verification device 200 (S413).

Further, the quantum state after change of the third quantum state caused by the measurement of the third quantum state (S412) is called a fourth quantum state. The verification target device 300 measures the fourth quantum state, using the measurement random number (q1, q2, q3) generated by the random number generation unit 203 (S416). The measurement result obtained from the measurement of the fourth quantum state by the verification target device 300 (S416) is called a fourth measurement result (v1, v2, v3). The verification target device 300 transmits the fourth measurement result (v1, v2, v3) to the verification device 200 (S417).

The verification target device 300 executes a quantum state generation and measurement sequence multiple times, the quantum state generation and measurement sequence consisting of generation of the first quantum state and measurement of the first quantum state, and measurement of the second quantum state or measurement of the third quantum state and measurement of the fourth quantum state.

Then, in each execution of the quantum state generation and measurement sequence, the verification target device 300 performs transmission of the first measurement result (y1, y2, y3) to the verification device 200 (S405), and transmission of the second measurement result (m1, m2, m3) to the verification device 200 (S409) or transmission of the third measurement result (d1, d2, d3) and transmission of the fourth measurement result (v1, v2, v3) to the verification device 200 (S413, S417).

As mentioned above, the result confirmation unit 204 computes the state space probability, the Pauli measurement probability, and the magic state probability.

The result confirmation unit 204 also computes the degree of approximation between the fourth quantum state and the magic state of CCZ as well as measurement accuracies of the Pauli Z measurement and the Pauli X measurement on the fourth quantum state, using the state space probability, the Pauli measurement probability, and the magic state probability.

The state space probability is a probability that the verification target device 300 has not correctly prepared a state space having the first quantum state stored therein. The state space probability is hereinafter denoted as state space probability E1 or probability E1.

The result confirmation unit 204 computes the state space probability E1, using the public key (k1, k2, k3), and the first measurement result (y1, y2, y3) and the second measurement result (m1, m2, m3) for each execution of the quantum state generation and measurement sequence.

The Pauli measurement probability is a probability that the verification target device 300 did not correctly perform Pauli Z measurement and Pauli X measurement in the fourth quantum state. The Pauli measurement probability is hereinafter denoted as Pauli measurement probability E2 or probability E2.

The result confirmation unit 204 computes the Pauli measurement probability E2, using the public key (k1, k2, k3), the trapdoor (tk1, tk2, tk3), and the first measurement result (y1, y2, y3), the third measurement result (d1, d2, d3), and the fourth measurement result (v1, v2, v3) for each execution of the quantum state generation and measurement sequence.

The magic state probability is a probability that the verification target device 300 has not generated the magic state of CCZ. The magic state probability is hereinafter denoted as magic state probability E3 or probability E3.

The result confirmation unit 204 computes the magic state probability E3, using the public key (k1, k2, k3), the trapdoor (tk1, tk2, tk3), and the first measurement result (y1, y2, y3), the third measurement result (d1, d2, d3), and the fourth measurement result (v1, v2, v3) for each execution of the quantum state generation and measurement sequence.

Next, the operation of the quantumness verification system 100 according to the present embodiment is described with reference to a flowchart.

Figure 2:
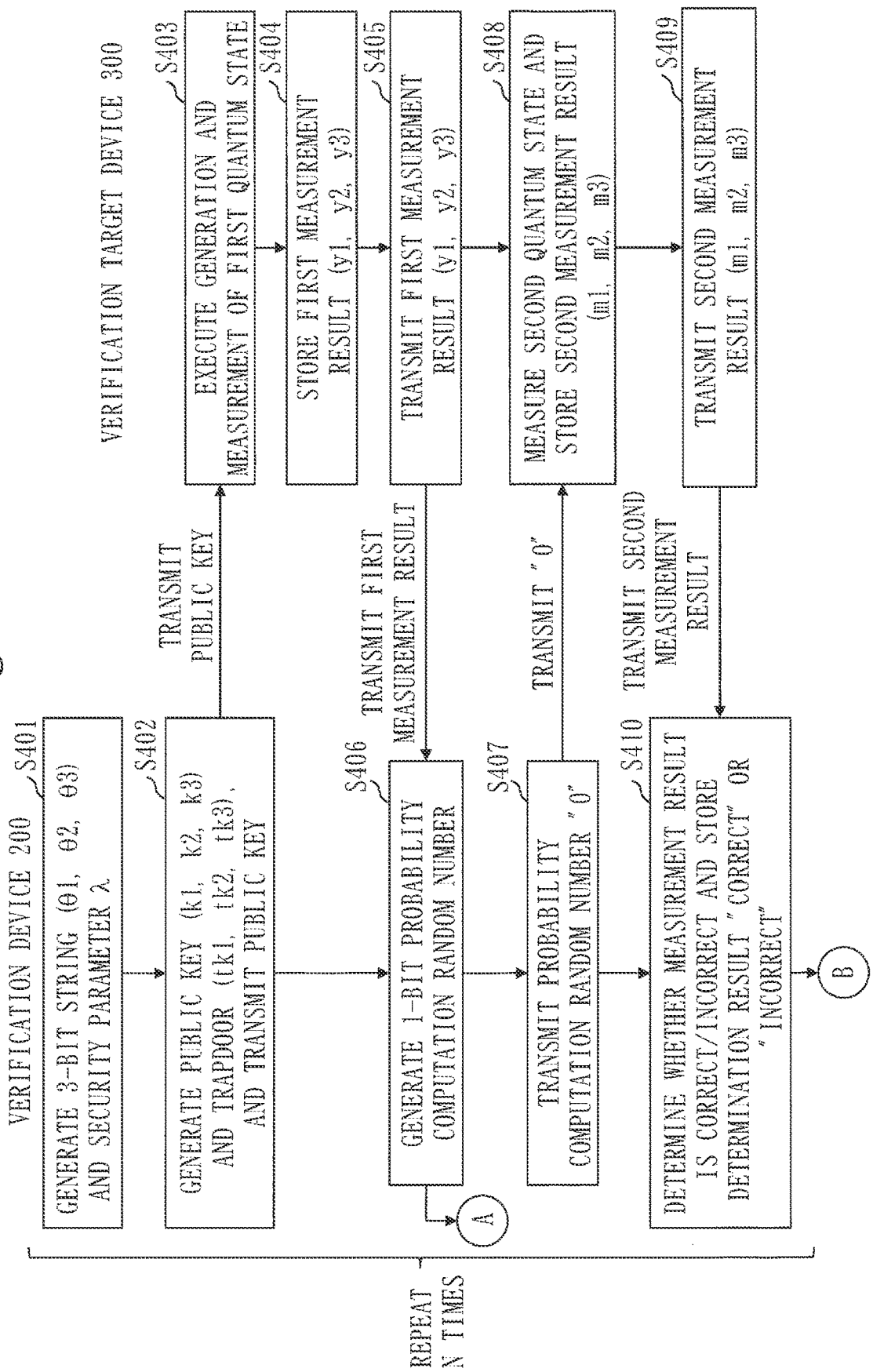
FIG. 2 is a flowchart illustrating an operation example of the quantumness verification system according to Embodiment 1.
Figure 3:
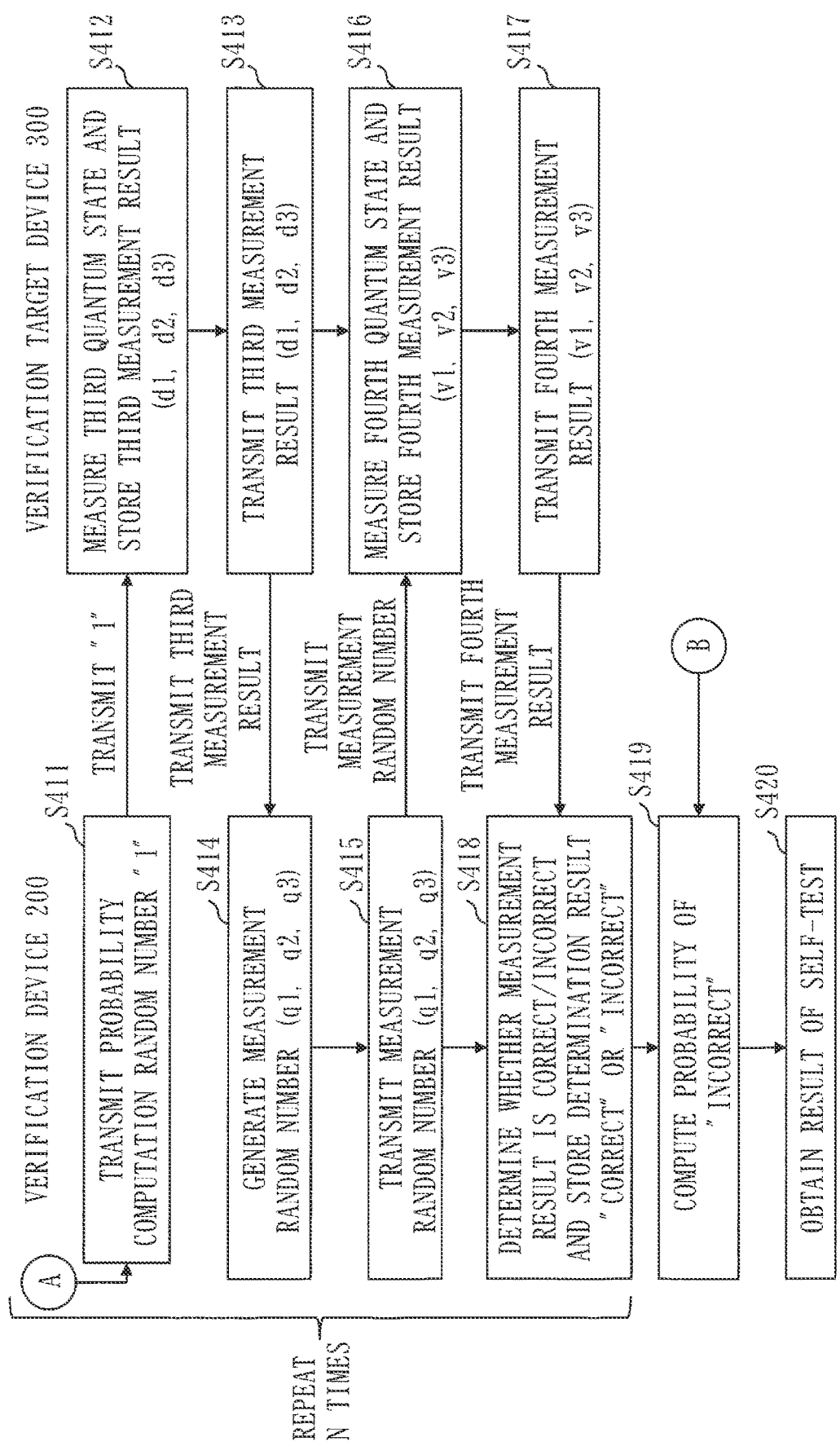
FIG. 3 is a flowchart illustrating the operation example of the quantumness verification system according to Embodiment 1.

FIGS. 2 and 3 is a flowchart illustrating a procedure of quantumness verification using the quantumness verification system 100 of FIG. 1.

Steps S401, S402, S406, S407, and S410 in FIG. 2 and steps S411, S414, S415, and S418 to S420 in FIG. 3 are processing performed by the verification device 200. Steps S403 to S405, S408, and S409 in FIG. 2 and steps S412, S413, S416, and S417 in FIG. 3 are processing performed by the verification target device 300.

The procedure formed of steps S401 to S418 corresponds to the quantum state generation and measurement sequence. In the present embodiment, the quantum state generation and measurement sequence is repeated N times. The way of determining the value of "N" will be described later.

In step S401, the data generation unit 201 randomly selects one 3-bit string from the set of 3-bit strings {000, 001, 010, 100, 111}. Then, the data generation unit 201 transmits the selected 3-bit string (θ1, θ2, θ3) to the key information generation unit 202.

The data generation unit 201 also generates a security parameter k and transmits the generated security parameter λ to the key information generation unit 202.

In step S402, the key information generation unit 202 generates a public key (k1, k2, k3) and a trapdoor (tk1, tk2, tk3) based on the initial data generated by the data generation unit 201 (the 3-bit string (θ1, θ2, θ3) and the security parameter k). Then, the key information generation unit 202 sends the public key (k1, k2, k3) to the verification target device 300 through the communication device 904 and the classical communication channel 101.

Here, the trapdoor (tk1, tk2, tk3) is secret information and thus needs to be strictly protected so that it does not leak outside the verification device 200.

In step S403, based on the public key (k1, k2, k3) transmitted from the verification device 200, the quantum state generation unit 301 generates a quantum state (the first quantum state). Then, the quantum state measurement unit 302 performs measurement of the generated quantum state (the first quantum state).

In step S404, the verification target device 300 stores the first measurement result (y1, y2, y3).

In step S405, the quantum state measurement unit 302 transmits the first measurement result (y1, y2, y3) to the verification device 200 through the classical communication channel 101.

At the verification device 200, the result confirmation unit 204 receives the first measurement result (y1, y2, y3) via the communication device 904. Then, the result confirmation unit 204 stores the first measurement result (y1, y2, y3) in the secondary storage device 903. The secondary storage device 903 stores the first measurement result (y1, y2, y3).

In step S406, the random number generation unit 203 generates a 1-bit random number (a probability computation random number).

If the random number (the probability computation random number) generated in step S406 is "0", steps S407 to S410 are performed. On the other hand, if the random number (the probability computation randomnumber) generated in step S406 is "1", steps S411 to S418 are performed.

[When the Random Number Generated in Step S406 is 0]

In step S407, the random number generation unit 203 of the verification device 200 transmits the value "0" of the probability computation random number to the verification target device 300 through the communication device 904 and the classical communication channel 101. The random number generation unit 203 also indicates the value "0" of the probability computation random number to the result confirmation unit 204.

In step S408, the quantum state measurement unit 302 measures the second quantum state based on the value "0" of the probability computation random number and stores the second measurement result (m1, m2, m3).

In step S409, the quantum state measurement unit 302 transmits the second measurement result (m1, m2, m3) to the verification device 200 through the classical communication channel 101.

In step S410, the result confirmation unit 204 receives the second measurement result (m1, m2, m3) via the communication device 904. Then, the result confirmation unit 204 stores the second measurement result (m1, m2, m3) in the secondary storage device 903. The secondary storage device 903 stores the second measurement result (m1, m2, m3).

Further, the result confirmation unit 204 uses the public key (k1, k2, k3) generated in step S402 to determine whether the first measurement result (y1, y2, y3) transmitted from the verification target device 300 in step S405 and the second measurement result (m1, m2, m3) transmitted from the verification target device 300 in step S409 are correct or incorrect. Then, the result confirmation unit 204 stores a determination result "correct" or "incorrect" in the secondary storage device 903. The secondary storage device 903 stores the determination result "correct" or "incorrect". Details of how the result confirmation unit 204 makes the determination will be discussed later.

[When the Random Number Generated in Step S406 is 1]

In step S411, the random number generation unit 203 of the verification device 200 transmits the value "1" of the probability computation random number to the verification target device 300 through the communication device 904 and the classical communication channel 101. The random number generation unit 203 also indicates the value "1" of the probability computation random number to the result confirmation unit 204.

In step S412, the quantum state measurement unit 302 measures the third quantum state based on the value "1" of the probability computation random number and stores the third measurement result (d1, d2, d3).

In step S413, the quantum state measurement unit 302 transmits the third measurement result (d1, d2, d3) to the verification device 200 through the classical communication channel 101.

In step S414, the result confirmation unit 204 receives the third measurement result (d1, d2, d3) via the communication device 904. Then, the result confirmation unit 204 stores the third measurement result (d1, d2, d3) in the secondary storage device 903. The secondary storage device 903 stores the third measurement result (d1, d2, d3).

Further, the random number generation unit 203 generates a 3-bit measurement random number (q1, q2, q3).

In step S415, the random number generation unit 203 transmits the 3-bit measurement random number (q1, q2, q3) to the verification target device 300 through the classical communication channel 101.

The random number generation unit 203 also indicates the measurement random number (q1, q2, q3) to the result confirmation unit 204.

In step S416, the quantum state measurement unit 302 measures the fourth quantum state based on the 3-bit measurement random number (q1, q2, q3) transmitted from the verification device 200, and stores the fourth measurement result (v1, v2, v3).

In step S417, the quantum state measurement unit 302 transmits the fourth measurement result (v1, v2, v3) to the verification device 200 through the classical communication channel 101.

In step S418, the result confirmation unit 204 receives the fourth measurement result (v1, v2, v3) via the communication device 904. Then, the result confirmation unit 204 stores the fourth measurement result (v1, v2, v3) in the secondary storage device 903. The secondary storage device 903 stores the fourth measurement result (v1, v2, v3).

Further, the result confirmation unit 204 determines whether the first measurement result (y1, y2, y3) transmitted from the verification target device 300 in step S405, the third measurement result (d1, d2, d3) transmitted from the verification target device 300 in step S413, and the fourth measurement result (v1, v2, v3) transmitted from the verification target device 300 in step S416 are correct or incorrect, and stores a determination result "correct" or "incorrect" in the secondary storage device 903. The secondary storage device 903 stores the determination result "correct" or "incorrect".

More specifically, the result confirmation unit 204 determines whether the first measurement result (y1, y2, y3), the third measurement result (d1, d2, d3), and the fourth measurement result (v1, v2, v3) are correct or incorrect using the 3-bit string (θ1, θ2, θ3) generated in step S401, the public key (k1, k2, k3) and trapdoor (tk1, tk2, tk3) generated in step S402, and the measurement random number (q1, q2, q3) generated in step S414.

After the above-described quantum state generation and measurement sequence is performed N times, in step S419, the result confirmation unit 204 computes the probability E1, the probability E2, and the probability E3, using the determination results "incorrect" obtained in step S410 and step S418.

Finally, in step S420, the result confirmation unit 204 obtains the result of the self-test based on the probability E1, probability E2, and probability E3 computed in step S419.

Next, details of the operations of the result confirmation unit 204 at steps S410, S418, S419, and S420 are described.

[When the Probability Computation Random Number Indicated from the Random Number Generation Unit 203 is "0"]

That is, if a probability computation random number of "0" is indicated from the random number generation unit 203 in step S407, the result confirmation unit 204 determines whether the second measurement result (m1, m2, m3) is correct or incorrect in step S410 in the following procedure.

Note that step S410 is processing aimed at verifying whether or not the verification target device 300 has correctly prepared a state space having the first quantum state stored therein.

The result confirmation unit 204 determines whether the second measurement result (m1, m2, m3) is correct or incorrect using the public key (k1, k2, k3) received from the key information generation unit 202, and the first measurement result (y1, y2, y3) and the second measurement result (m1, m2, m3) received from the verification target device 300. The result confirmation unit 204 determines whether the second measurement result (m1, m2, m3) is correct or incorrect with the method described in Non-Patent Literature 2.

If the verification target device 300 has correctly prepared a state space having the first quantum state stored therein, the probability that the second measurement result (m1, m2, m3) is determined as "incorrect" is zero. However, if the verification target device 300 has not correctly prepared a state space having the first quantum state stored therein, the probability that the second measurement result (m1, m2, m3) is determined as "incorrect" is greater than zero.

[When the Probability Computation Random Number Indicated from the Random Number Generation Unit 203 is "1"]

If a probability computation random number of "1" is indicated from the random number generation unit 203 in step S411, the result confirmation unit 204 determines whether the first measurement result (y1, y2, y3), the third measurement result (d1, d2, d3), and the fourth measurement result (v1, v2, v3) are correct or incorrect in step S418 in the following procedure.

The processing at step S418 is processing aimed at verifying whether or not the verification target device 300 has correctly performed Pauli Z measurement and Pauli X measurement in the fourth quantum state and whether it has correctly generated the magic state of CCZ.

Specifically, the result confirmation unit 204 determines correctness or incorrectness according to the rules (a) to (e) below.

The rules (a) to (d) are rules for the result confirmation unit 204 to verify whether the verification target device 300 has correctly performed Pauli Z measurement and Pauli X measurement on the fourth quantum state or not. The rule (e) is a rule for the result confirmation unit 204 to verify whether the verification target device 300 has correctly generated the magic state of CCZ for the fourth quantum state or not.

Rule (a): applied when (θ1, θ2, θ3)=(0, 0, 0)

The random number generation unit 203 randomly generates any one of values "1, 2, 3" and transmits the generated value to the result confirmation unit 204. Assume that the value transmitted from the random number generation unit 203 to the result confirmation unit 204 is "i". Here, "i" is any one of the values "1, 2, 3".

The result confirmation unit 204 obtains a public key ki corresponding to "i" from the public key (k1, k2, k3) received from the key information generation unit 202. The result confirmation unit 204 also obtains a measurement result yi corresponding to "i" from the first measurement result (y1, y2, y3) received from the verification target device 300. Then, the result confirmation unit 204 derives a bit bi from the obtained measurement result yi. Then, the result confirmation unit 204 determines whether (Condition 1) and (Condition 2) below hold simultaneously or not.

If (Condition 1) and (Condition 2) hold simultaneously, the result confirmation unit 204 stores a determination result "incorrect" in the secondary storage device 903. If even one of (Condition 1) and (Condition 2) does not hold, the result confirmation unit 204 stores a determination result "correct" in the secondary storage device 903.

(Condition 1) "bi is different from the measurement result v1 received from the verification target device 300"

(Condition 2) "qi is equal to 0"

Here, the bit bi is a check bit for checking whether the verification target device 300 has correctly prepared a state in the Z basis in the ith quantum state in the fourth quantum state and has correctly performed Pauli Z measurement or not. So, the bit bi is called "ith Z basis—state generation and measurement—check bit". The result confirmation unit 204 calculates the "ith Z basis—state generation and measurement—check bit bi" with the scheme described in Non-Patent Literature 2. The "ith Z basis—state generation and measurement—check bit bi" corresponds to a Z basis check bit. Also, processing based on rule (a) is called a Z basis check process.

The measurement result v1 is a measurement result corresponding to "i" from the fourth measurement result (v1, v2, v3). The bit qi is a bit corresponding to "i" from the measurement random number (q1, q2, q3).

Rule (b): applied when (θ1, θ2, θ3)=(1, 0, 0)

The result confirmation unit 204 derives a bit r1 from the public key (k1, k2, k3) and trapdoor (tk1, tk2, tk3) received from the key information generation unit 202, the first measurement result (y1, y2, y3) received from the verification target device 300, and a first measurement result d1 of the third measurement result (d1, d2, d3). Then, the result confirmation unit 204 determines whether (Condition 1) and (Condition 2) below hold simultaneously or not.

If (Condition 1) and (Condition 2) hold simultaneously, the result confirmation unit 204 stores a determination result "incorrect" in the secondary storage device 903. If even one of (Condition 1) and (Condition 2) does not hold, the result confirmation unit 204 stores a determination result "correct" in the secondary storage device 903.

(Condition 1) "r1 is different from the measurement result v1 received from the verification target device 300"

(Condition 2) "q1 is equal to 1"

Here, the bit r1 is a check bit for checking whether the verification target device 300 has correctly prepared a state in the X basis in the first quantum state in the fourth quantum state and has correctly performed Pauli X measurement or not. So, the bit r1 is called "the first X basis—state generation and measurement—check bit". The result confirmation unit 204 calculates the "first X basis—state generation and measurement—check bit r1" with the scheme described in Non-Patent Literature 2. The "first X basis—state generation and measurement—check bit r1" corresponds to an X basis check bit. Also, processing based on rule (b) is called an X basis check process.

The measurement result v1 is a first measurement result v1 of the fourth measurement result (v1, v2, v3). The bit q1 is a first bit q1 of the measurement random number (q1, q2, q3).

Rule (c): applied when $(\theta 1, \theta 2, \theta 3)=(0, 1, 0)$

The result confirmation unit 204 derives a bit r2 from the public key (k1, k2, k3) and trapdoor (tk1, tk2, tk3) received from the key information generation unit 202, the first measurement result (y1, y2, y3) received from the verification target device 300, and a second measurement result d2 of the third measurement result (d1, d2, d3). Then, the result confirmation unit 204 determines whether (Condition 1) and (Condition 2) below hold simultaneously or not.

If (Condition 1) and (Condition 2) hold simultaneously, the result confirmation unit 204 stores a determination result "incorrect" in the secondary storage device 903. If even one of (Condition 1) and (Condition 2) does not hold, the result confirmation unit 204 stores a determination result "correct" in the secondary storage device 903.

(Condition 1) "r2 is different from the measurement result v2 received from the verification target device 300"

(Condition 2) "q2 is equal to 1"

Here, the bit r2 is a check bit for checking whether the verification target device 300 has correctly prepared a state in the X basis in the second quantum state in the fourth quantum state and has correctly performed Pauli X measurement or not. So, the bit r2 is called "the second X basis—state generation and measurement—check bit". The result confirmation unit 204 calculates the "second X basis—state generation and measurement—check bit r2" with the scheme described in Non-Patent Literature 2. The "second X basis—state generation and measurement—check bit r2" corresponds to an X basis check bit. Also, processing based on rule (c) is called an X basis check process.

The measurement result v2 is a second measurement result v2 of the fourth measurement result (v1, v2, v3). The bit q2 is a second bit q2 of the measurement random number (q1, q2, q3).

Rule (d): applied when $(\theta 1, \theta 2, \theta 3)=(0, 0, 1)$

The result confirmation unit 204 derives a bit r3 from the public key (k1, k2, k3) and trapdoor (tk1, tk2, tk3) received from the key information generation unit 202, the first measurement result (y1, y2, y3) received from the verification target device 300, and a third measurement result d3 of the third measurement result (d1, d2, d3). Then, the result confirmation unit 204 determines whether (Condition 1) and (Condition 2) below hold simultaneously or not.

If (Condition 1) and (Condition 2) hold simultaneously, the result confirmation unit 204 stores a determination result "incorrect" in the secondary storage device 903. If even one of (Condition 1) and (Condition 2) does not hold, the result confirmation unit 204 stores a determination result "correct" in the secondary storage device 903.

(Condition 1) "r3 is different from the measurement result v3 received from the verification target device 300"

(Condition 2) "q3 is equal to 1"

Here, the bit r3 is a check bit for checking whether the verification target device 300 has correctly prepared a state in the X basis in the third quantum state in the fourth quantum state and has correctly performed Pauli X measurement or not. So, the bit r3 is called "the third X basis—state generation and measurement—check bit". The result confirmation unit 204 calculates the "third X basis—state generation and measurement—check bit r3" with the scheme described in Non-Patent Literature 2. The "third X basis—state generation and measurement—check bit r3" corresponds to an X basis check bit. Also, processing based on rule (d) is called an X basis check process.

The measurement result v3 is a third measurement result v3 of the fourth measurement result (v1, v2, v3). The bit q3 is a third bit q3 of the measurement random number (q1, q2, q3).

Rule (e): applied when $(\theta 1, \theta 2, \theta 3)=(1, 1, 1)$

The result confirmation unit 204 computes a result of generalized stabilizer measurement 1, a result of generalized stabilizer measurement 2, and a result of generalized stabilizer measurement 3 as below, using the fourth measurement result (v1, v2, v3) received from the verification target device 300.

The result of the generalized stabilizer measurement 1: $v1+\delta(v2, 1) v3$

The result of the generalized stabilizer measurement 2: $v2+\delta(v1, 1) v3$

The result of the generalized stabilizer measurement 3: $v3+\delta(v1, 1) v2$

Here, the symbol "+" represents an exclusive OR of bits. Specifically, 0+0=0, 0+1=1, 1+0=1, and 1+1=0 hold. The symbol "·" represents a product of bits. Specifically, 0·0=0, 0·1=0, 1·0=0, and 1·1=1 hold. "$\delta(x, 1)$" is a so-called Kronecker delta function, which outputs "1" when "x" is "1" and "0" when "x" is not "1".

Also, the result confirmation unit 204 derives a bit u1, a bit u2, and a bit u3 from the public key (k1, k2, k3) received from the key information generation unit 202, and the first measurement result (y1, y2, y3) and the third measurement result (d1, d2, d3) received from the verification target device 300.

Here, the bit u1 is a validity check bit for checking the validity of the result of the generalized stabilizer measurement 1 above. The bit u2 is a validity check bit for checking the validity of the result of the generalized stabilizer measurement 2 above. The bit u3 is a validity check bit for checking the validity of the result of the generalized stabilizer measurement 3 above. The result confirmation unit 204 calculates the validity check bit u1, the validity check bit u2, and the validity check bit u3 with the scheme described in Non-Patent Literature 2.

The validity check bit u1, the validity check bit u2, and the validity check bit u3 each correspond to a generalized stabilizer measurement result check bit.

Then, the result confirmation unit 204 stores a determination result "incorrect" in the secondary storage device 903 if (Condition 1) and (Condition 2) simultaneously hold in any of (1) to (3) below. Otherwise, the result confirmation unit 204 stores a determination result "correct" in the secondary storage device 903.

(1) (Condition 1) "(q1, q2, q3)=(1, 0, 0) holds"
   (Condition 2) "u1 is different from the result of generalized stabilizer measurement 1: v1+δ(v2, 1) v3"
(2) (Condition 1) "(q1, q2, q3)=(0, 1, 0) holds"
   (Condition 2) "u2 is different from the result of generalized stabilizer measurement 2: v2+δ(v1, 1) v3"
(3) (Condition 1) "(q1, q2, q3)=(0, 0, 1) holds"
   (Condition 2) "u3 is different from the result of generalized stabilizer measurement 3: v3+δ(v1, 1) v2"

After the quantum state generation and measurement sequence is performed N times, in step S419, the result confirmation unit 204 computes the probability E1, the probability E2, and the probability E3, using the determination results "incorrect" obtained in step S410 and step S418. The result confirmation unit 204 computes the probability E1, the probability E2, and the probability E3 in the following procedure.

Probability E1: the probability that a determination result "incorrect" is obtained in step S410

Probability E2: the probability that a determination result "incorrect" is obtained in step S418 when (θ1, θ2, θ3) is other than (1, 1, 1)

Probability E3: the probability that a determination result "incorrect" is obtained in step S418 when (θ1, θ2, θ3) is (1, 1, 1)

In step S420, the result confirmation unit 204 obtains the result of the self-test shown below.

[Result 1]

When (θ1, θ2, θ3) generated in step S401 is (1, 1, 1), the result confirmation unit 204 obtains the result that "the verification target device 300 has generated a quantum state that is separated from the magic state of CCZ by a distance H1(E1, E2, E3)".

H1(E1, E2, E3) is a function defined by the probability E1, the probability E2, and the probability E3 mentioned above.

Closeness between quantum states is measured by a metric generally known as trace distance. The distance H1(E1, E2, E3) represents the closeness between the fourth quantum state and the magic state of CCZ. The result confirmation unit 204 computes the degree of approximation between the fourth quantum state and the magic state of CCZ by calculating the function H1(E1, E2, E3).

[Result 2]

When (θ1, θ2, θ3) generated in step S401 is (1, 1, 1), the result confirmation unit 204 obtains the result that "[the probability distribution of the measurement result that is obtained when a quantum state generated by the verification target device 300 is measured based on the measurement random number (q1, q2, q3) generated in step S414] and [the probability distribution of the measurement result that is obtained when the CCZ magic state is measured based on the measurement random number (q1, q2, q3) generated in step S414] is separated from each other by a distance H2(E1, E2, E3)".

Here, H2(E1, E2, E3) is a function defined by the probability E1, the probability E2, and the probability E3 mentioned above.

Closeness between probability distributions is measured by a metric generally known as trace distance.

In a measurement that is based on the measurement random number (q1, q2, q3) generated in step S414 with respect to the CCZ magic state, if the value of the bit qi (where "i" is any one of numbers "1, 2, 3") is "0", Pauli Z measurement is indicated, while if the value of the bit qi is "1", Pauli X measurement is indicated.

The result confirmation unit 204 computes the measurement accuracies of the Pauli Z measurement and Pauli X measurement for the fourth quantum state by calculating the function H2(E1, E2, E3).

[Grounds for Results 1 and 2]

If the probability E1 that a determination result "incorrect" was obtained in step S410 is zero, it means that the verification target device 300 correctly prepared a state space having the first quantum state stored therein.

If the probability E2 that a determination result "incorrect" was obtained in step S418 is zero, it means that the verification target device 300 correctly performed Pauli Z measurement and Pauli X measurement on the fourth quantum state.

If the probability E3 that "incorrect" was obtained in step S418 is zero, it means that the verification target device 300 correctly generated the magic state of CCZ.

Accordingly, if all of the probability E1, the probability E2, and the probability E3 are zero, the distance H1 and the distance H2 are zero.

At least any one of the probability E1, the probability E2, and the probability E3 is not zero, it means that the verification target device 300 did not perform correct Pauli Z measurement and/or Pauli X measurement on the fourth quantum state, and/or that the verification target device 300 did not correctly perform the generation of the magic state of CCZ. So, as the probability E1, the probability E2, and the probability E3 are greater, it means that the quantum state generated by the verification target device 300 is at a further distance from the magic state of CCZ and/or that it is at a further distance from an ideal Pauli measurement (the accuracy of Pauli measurement is lower).

An explicit relationship (a specific function form) between the probability E1, the probability E2, and the probability E3 that determination results "incorrect" were obtained in steps S410 and S418, and the distance H1(E1, E2, E3) and the distance H2(E1, E2, E3) is determined by a calculation based on the principle of quantum mechanics.

[About the Value of "N"]

The value of "N", or the number of repetitions of the quantum state generation and measurement sequence, is determined by a computation accuracy T of the probability E1, probability E2, probability E3 computed in step S419 and by a probability P of obtaining [Result 1] and [Result 2]. Here, the probability P is the probability that the result is correct. That is, in the case of [Result 1], the probability P is the probability that the result that "the verification target device 300 has generated a quantum state that is separated from the magic state of CCZ by the distance H1(E1, E2, E3)" is correct.

A computation formula (expression 1) of the value of N using the computation accuracy T and the probability P is shown below. However, expression 1 shows an example of the way of computing the value of N; the value of N may be determined in a different way. That is, the value of N may be determined in any manner as long as it is determined from the "computation accuracy T" and the "probability P".

$$N=(1/2T^2)\times\ln(3/(1-P)) \quad \text{expression 1}$$

In expression 1, "ln" represents a natural logarithm.

The value of N in expression 1 can be derived by using the probability inequality (Hoeffding inequality) known in statistical mathematics.

*Description of the Effects of the Embodiment*

The present embodiment enables a self-test to be performed also on the "magic state of CCZ" in the same framework as Non-Patent Literature 2.

In the present embodiment, a classical computer can verify a black box device, operation of which is unknown. Thus, the present embodiment can verify the accuracy of generation and measurement of the "magic state of CCZ", which is a quantum state essential for the realization of quantum computation. That is, the present embodiment enables verification of quantumness.

\*\*\*Additional Description on Hardware Configuration\*\*\*

Finally, the hardware configuration of the verification device 200 is additionally described.

A processor 901 shown in FIG. 4 is an IC (Integrated Circuit) that performs processing.

The processor 901 is a CPU (Central Processing Unit), DSP (Digital Signal Processor), or the like.

The main storage device 902 shown in FIG. 4 is a RAM (Random Access Memory).

The secondary storage device 903 shown in FIG. 4 is a ROM (Read Only Memory), a flash memory, an HDD (Hard Disk Drive), or the like.

The communication device 904 shown in FIG. 4 is an electronic circuit that executes communication processing for data.

The communication device 904 is a communication chip or a NIC (Network Interface Card), for example.

The secondary storage device 903 also stores an OS (Operating System).

At least a portion of the OS is then executed by the processor 901.

The processor 901 executes the program for implementing the functions of the data generation unit 201, the key information generation unit 202, the random number generation unit 203, and the result confirmation unit 204 while executing at least a portion of the OS.

Through the execution of the OS by the processor 901, task management, memory management, file management, communication control, and the like are performed.

At least any of information, data, signal values, and variable values indicating the results of processing by the data generation unit 201, the key information generation unit 202, the random number generation unit 203, and the result confirmation unit 204 are stored in at least any of the main storage device 902, the secondary storage device 903, and a register and a cache memory in the processor 901.

The programs for implementing the functions of the data generation unit 201, the key information generation unit 202, the random number generation unit 203, and the result confirmation unit 204 may be stored in a portable recording medium such as a magnetic disk, a flexible disk, an optical disk, a compact disk, Blu-ray (registered trademark) disk, and a DVD. Then, the portable recording medium storing the programs for implementing the functions of the data generation unit 201, the key information generation unit 202, the random number generation unit 203, and the result confirmation unit 204 may be distributed.

The "units" of the data generation unit 201, the key information generation unit 202, the random number generation unit 203, and the result confirmation unit 204 may be read as "circuits" or "steps" or "procedures" or "processes" or "circuitry".

The verification device 200 may be implemented by a processing circuit. The processing circuit is a logic IC (Integrated Circuit), a GA (Gate Array), an ASIC (Application Specific Integrated Circuit), or an FPGA (Field-Programmable Gate Array), for example.

In this case, the data generation unit 201, the key information generation unit 202, the random number generation unit 203, and the result confirmation unit 204 are implemented as portions of the processing circuit.

In the present specification, a superordinate concept of processor and processing circuit is referred to as "processing circuitry".

That is, processors and processing circuits are each a specific example of "processing circuitry".

REFERENCE SIGNS LIST

100: quantumness verification system; 101: classical communication channel; 200: verification device; 201: data generation unit; 202: key information generation unit; 203: random number generation unit; 204: result confirmation unit; 300: verification target device; 301: quantum state generation unit; 302: quantum state measurement unit

The invention claimed is:

1. A classical computer comprising:

processing circuitry:

to, using a first measurement result and a second measurement result, compute a state space probability that is a probability that a quantum computer has not correctly prepared a state space having a first quantum state stored therein, the first quantum state being a quantum state generated by the quantum computer, wherein the first measurement result is a result of measuring the first quantum state by the quantum computer, and the second measurement result is a result of measuring a second quantum state by the quantum computer, the second quantum state being a quantum state after change of the first quantum state caused by the measurement of the first quantum state;

to, using a third measurement result, a fourth measurement result, and the first measurement result, compute a Pauli measurement probability that is a probability that the quantum computer has not correctly performed Pauli Z measurement and Pauli X measurement on a fourth quantum state, wherein the third measurement result is a result of measuring a third quantum state by the quantum computer, the third quantum state being a quantum state after change of the first quantum state caused by the measurement of the first quantum state and different from the second quantum state, and the fourth measurement result is a result of measuring the fourth quantum state by the quantum computer, the fourth quantum state being a quantum state after change of the third quantum state caused by the measurement of the third quantum state;

to, using the first measurement result, the third measurement result, and the fourth measurement result, compute a magic state probability that is a probability that the quantum computer has not generated a magic state of CCZ (Controlled Controlled-Z); and to, using the state space probability, the Pauli measurement probability, and the magic state probability, compute a degree of approximation between the fourth quantum state and the magic state of CCZ, and measurement accuracies of the Pauli Z measurement and the Pauli X measurement on the fourth quantum state, wherein the processing circuitry generates a public key and a trapdoor from initial data, the quantum computer generates the first quantum state based on the public key, the processing circuitry computes the state space probability, using the first measurement result, the second measurement result, and the public key, the processing circuitry computes the Pauli measurement probability, using the first measurement result, the third measurement result, the fourth measurement result, the public key, and the trapdoor, and the processing circuitry computes the magic state probability, using the first measurement result, the third measurement result, the fourth measurement result, the public key, and the trapdoor.

2. The classical computer according to claim 1, wherein the processing circuitry computes the Pauli measurement probability by performing a Z basis check process to, using the first measurement result and the public key, generate a Z basis check bit for checking whether the quantum computer has correctly prepared a state in Z basis for the fourth quantum state and has correctly performed the Pauli Z measurement or not, and to determine whether the Z basis check bit agrees with the fourth measurement result or not, and an X basis check process to, using the first measurement result, the third measurement result, the public key, and the trapdoor, generate an X basis check bit for checking whether the quantum computer has correctly prepared a state in X basis in the fourth quantum state and has correctly performed the Pauli X measurement or not, and to determine whether the X basis check bit agrees with the fourth measurement result or not.

3. The classical computer according to claim 1, wherein the processing circuitry computes the magic state probability by: computing a generalized stabilizer measurement result, using the fourth measurement result and Kronecker delta; generating a generalized stabilizer measurement result check bit for checking validity of the generalized stabilizer measurement result, using the first measurement result, the third measurement result, the public key, and the trapdoor; and determining whether the generalized stabilizer measurement result agrees with the generalized stabilizer measurement result check bit or not.

4. The classical computer according to claim 1, wherein the processing circuitry generates a probability computation random number that is a random number for determining which of computation of the state space probability, computation of the Pauli measurement probability, and computation of the magic state probability is to be performed, depending on a value of the probability computation random number, the processing circuitry performs any one of computation of the state space probability, computation of the Pauli measurement probability, and computation of the magic state probability.

5. The classical computer according to claim 1, wherein the quantum computer executes a quantum state generation and measurement sequence multiple times, the quantum state generation and measurement sequence consisting of generation of the first quantum state and measurement of the first quantum state, and measurement of the second quantum state or measurement of the third quantum state and measurement of the fourth quantum state, the processing circuitry computes the state space probability using the first measurement result and the second measurement result for each of the quantum state generation and measurement sequence, the processing circuitry computes the Pauli measurement probability, using the first measurement result, the third measurement result, and the fourth measurement result for each of the quantum state generation and measurement sequence, and the processing circuitry computes the magic state probability, using the first measurement result, the third measurement result, and the fourth measurement result for each of the quantum state generation and measurement sequence.

6. The classical computer according to claim 2, wherein the processing circuitry generates a measurement random number that is a random number for use in measurement of the fourth quantum state by the quantum computer, the quantum computer measures the fourth quantum state, using the measurement random number, and the processing circuitry
in the Z basis check process, determines whether the Z basis check bit agrees with the fourth measurement result or not, and determines whether the measurement random number is of a prescribed value or not, and in the X basis check process, determines whether the X basis check bit agrees with the fourth measurement result or not, and determines whether the measurement random number is of a value other than the prescribed value or not.

7. The classical computer according to claim 3, wherein the processing circuitry generates a measurement random number that is a random number for use in measurement of the fourth quantum state by the quantum computer, the quantum computer measures the fourth quantum state, using the measurement random number, and the processing circuitry determines whether the generalized stabilizer measurement result agrees with the generalized stabilizer measurement result check bit or not, determines whether the measurement random number is of a prescribed value or not, and computes the magic state probability.

8. An information processing method, wherein
using a first measurement result and a second measurement result, a classical computer computes a state space probability that is a probability that a quantum computer has not correctly prepared a state space having a first quantum state stored therein, the first quantum state being a quantum state generated by the quantum computer, wherein the first measurement result is a result of measuring the first quantum state by the quantum computer, and the second measurement result is a result of measuring a second quantum state by the quantum computer, the second quantum state being a quantum state after change of the first quantum state caused by the measurement of the first quantum state;

using a third measurement result, a fourth measurement result, and the first measurement result, the classical computer computes a Pauli measurement probability that is a probability that the quantum computer has not correctly performed Pauli Z measurement and Pauli X measurement on a fourth quantum state, wherein the third measurement result is a result of measuring a third quantum state by the quantum computer, the third quantum state being a quantum state after change of the first quantum state caused by the measurement of the first quantum state and different from the second quantum state, and the fourth measurement result is a result of measuring the fourth quantum state by the quantum computer, the fourth quantum state being a quantum state after change of the third quantum state caused by the measurement of the third quantum state;

using the first measurement result, the third measurement result, and the fourth measurement result, the classical computer computes a magic state probability that is a probability that the quantum computer has not generated a magic state of CCZ (Controlled Controlled-Z); and using the state space probability, the Pauli measurement probability, and the magic state probability, the classical computer computes a degree of approximation between the fourth quantum state and the magic state of CCZ, and measurement accuracies of the Pauli Z measurement and the Pauli X measurement on the fourth quantum state, wherein the information processing method further comprises:
generating, by the classical computer, a public key and a trapdoor from initial data,
generating, by the quantum computer, the first quantum state based on the public key,
computing, by the classical computer, the state space probability, using the first measurement result, the second measurement result, and the public key,
computing, by the classical computer, the Pauli measurement probability, using the first measurement result, the third measurement result, the fourth measurement result, the public key, and the trapdoor, and
computing, by the classical computer, the magic state probability, using the first measurement result, the third measurement result, the fourth measurement result, the public key, and the trapdoor.

9. A non-transitory computer readable medium storing an information processing program that causes a classical computer to execute:
a state space probability computation process to, using a first measurement result and a second measurement result, compute a state space probability that is a probability that a quantum computer has not correctly prepared a state space having a first quantum state stored therein, the first quantum state being a quantum state generated by the quantum computer, wherein the first measurement result is a result of measuring the first quantum state by the quantum computer, and the second measurement result is a result of measuring a second quantum state by the quantum computer, the second quantum state being a quantum state after change of the first quantum state caused by the measurement of the first quantum state;
a Pauli measurement probability computation process to, using a third measurement result, a fourth measurement result, and the first measurement result, compute a Pauli measurement probability that is a probability that the quantum computer has not correctly performed Pauli Z measurement and Pauli X measurement on a fourth quantum state, wherein the third measurement result is a result of measuring a third quantum state by the quantum computer, the third quantum state being a quantum state after change of the first quantum state caused by the measurement of the first quantum state and different from the second quantum state, and the fourth measurement result is a result of measuring the fourth quantum state by the quantum computer, the fourth quantum state being a quantum state after change of the third quantum state caused by the measurement of the third quantum state;
a magic state probability computation process to, using the first measurement result, the third measurement result, and the fourth measurement result, compute a magic state probability that is a probability that the quantum computer has not generated a magic state of CCZ (Controlled Controlled-Z); and
an approximation accuracy computation process to, using the state space probability, the Pauli measurement probability, and the magic state probability, compute a degree of approximation between the fourth quantum state and the magic state of CCZ, and measurement accuracies of the Pauli Z measurement and the Pauli X measurement on the fourth quantum state, wherein
the information processing program causes the classical computer to further execute:
a key information generation process to generate a public key and a trapdoor from initial data, to enable the quantum computer to generate the first quantum state based on the public key,
the state space probability computation process to compute the state space probability, using the first measurement result, the second measurement result, and the public key,
the Pauli measurement probability computation process to compute the Pauli measurement probability, using the first measurement result, the third measurement result, the fourth measurement result, the public key, and the trapdoor, and
the magic state probability computation process to compute the magic state probability, using the first measurement result, the third measurement result, the fourth measurement result, the public key, and the trapdoor.

* * * * *